W. RUFF.
GASEOUS FUEL BURNER.
APPLICATION FILED MAY 15, 1920.

1,423,155.

Patented July 18, 1922.

William Ruff INVENTOR

Frank P. Wentworth
his ATTORNEY.

UNITED STATES PATENT OFFICE.

WILLIAM RUFF, OF NEW YORK, N. Y.

GASEOUS-FUEL BURNER.

1,423,155.  Specification of Letters Patent.  Patented July 18, 1922.

Application filed May 15, 1920. Serial No. 381,655.

*To all whom it may concern:*

Be it known that I, WILLIAM RUFF, a citizen of the United States, residing at the borough of Manhattan, city, county, and State of New York, have invented certain new and useful Improvements in Gaseous-Fuel Burners, of which the following is a specification, reference being had therein to the accompanying drawings, which form a part thereof.

My invention relates to gaseous fuel burners, and more particularly to a type thereof wherein an inflammable mixture is delivered under pressure at the burner openings.

In a burner made in accordance with my invention, I utilize a mixture of ordinary illuminating gas, steam and air, the pressure of the steam being such as to ensure the proper proportion of gas and air in, and substantial uniformity in the quality of, the mixture during a continued operation of the burner irrespective of varying pressure in the gas mains.

The quality of the mixture is such as to secure a long, blue and violet flame developing intense heat. There are no discernible fumes produced and no fouling of the steam generator tubes or the heating surfaces of a furnace with which the burner is used, thus indicating substantially complete combustion and resultant economy in the operation of the burner.

The steam used in the operation of the burner is generated in a coil or tube arranged within the combustion chamber adjacent the burner openings, thus ensuring the maintenance of the necessary steam pressure while the burner is in operation and permitting the production of a self contained unit applicable to any desired use, it being merely necessary when installing the burner, to connect it with suitable source of water and of gas supply.

The pressure of the steam generated will be determined by the pressure at which the water is delivered to the generator tubes or coil, although by using a valve controlling the water supply, the pressure may be controlled and yet afford an ample factor of safety in the operation of the burner.

To permit the use of water from city mains, I provide the inlet of the steam injector nozzle with a suitable filter to minimize likelihood of the fouling of the outlet opening of the injector tubes.

In a burner made in accordance with my invention, no mixing chamber is requisite, since a flame having the desired characteristics may be secured by using burner openings in an extension of the mixing tube.

The invention consists primarily in a gaseous fuel burner embodying therein a burner having openings therein, an injector nozzle, means whereby steam under pressure is supplied to said nozzle, a tube having an injector nozzle surrounding said first named nozzle and communicating with a source of gas supply, and a mixing tube surrounding said tube and having an air inlet opening, said mixing tube delivering the mixture to said burner; and in such other novel features of construction and combination of parts as are hereinafter set forth and described, and more particularly pointed out in the claims hereto appended.

Referring to the drawings.

Like letters refer to like parts throughout the several views.

Figure 1:
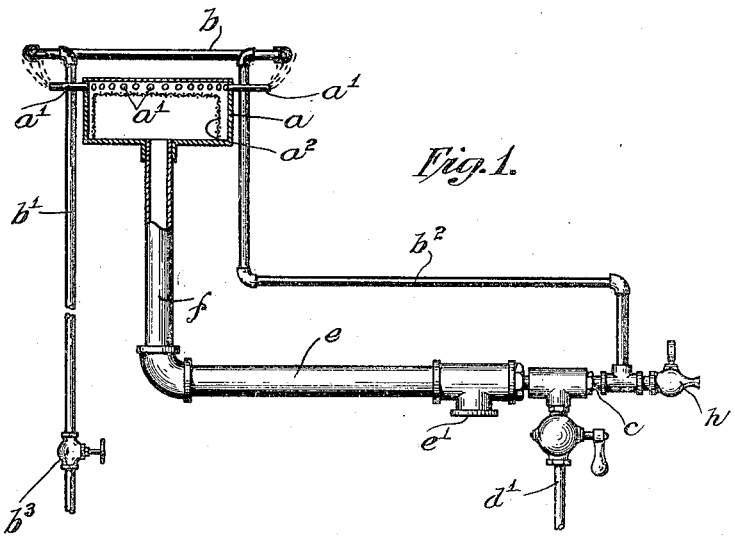
Fig. 1 is a side elevation of one embodiment of the invention, the burner being shown in vertical section.
Figure 2:
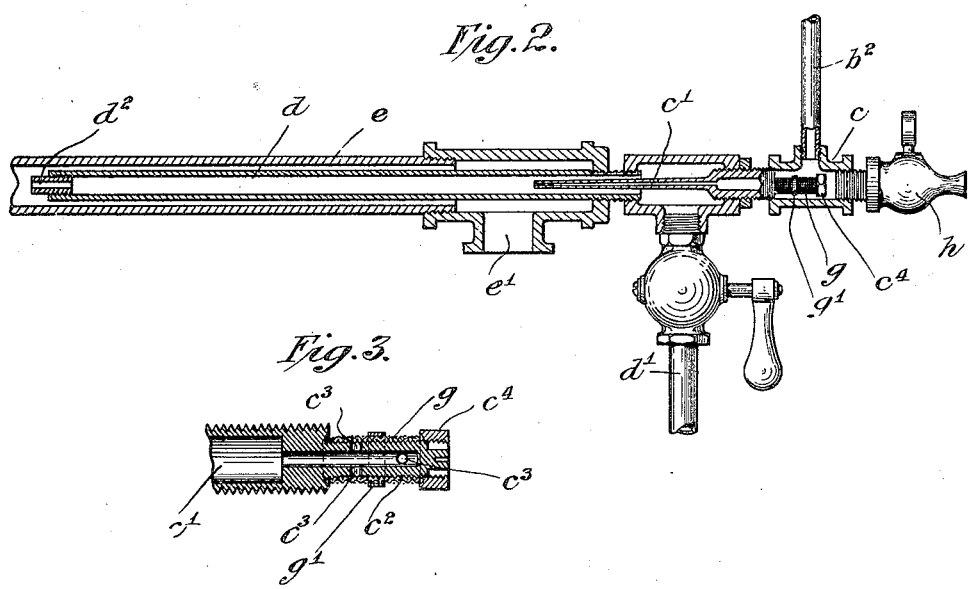
Fig. 2 is a vertical section of the mixing unit upon a larger scale.

In the embodiment of my invention shown in the drawings, I employ a burner $a$ having radially extending torches $a'$ provided with the usual end burner openings. This type of burner, however, is not essential to the invention, as I have secured highly satisfactory results with a straight tubular burner provided with alined openings and having no mixing chamber of the character shown in the burner $a$. When the type of burner shown is used, however, I provide the mixing chamber thereof with a wire gauze filter $a^2$.

Adjacent and above the openings of the various burner torches $a'$ is a steam generator tube or coil $b$ in communication, through the inlet pipe $b'$, with a source of water supply under pressure such as an ordinary city main.

The outlet pipe $b^2$ of said generator discharges into a conduit $c$ having a jet nozzle $c'$ leading therefrom, said nozzle being surrounded by a steam and gas mixing tube $d$, one end of which is adapted to be placed in communication with a source of illuminating gas supply through the valve controlled means $d'$, and the other end of which terminates in a jet nozzle $d^2$ spaced a sufficient distance from the jet nozzle $c'$ to ensure the desired intimate mixture of the gas and steam before delivery through said nozzle $d^2$.

Surrounding the tube $d$ is a larger tube $e$ having an air inlet opening $e'$ intermediate the point of delivery of gas to the tube $d$, and the jet nozzle $d^2$ of said tube. This tube $e$ serves as a mixing tube for the gas, steam and air mixture, which is delivered through the pipe $f$ to the burner $a$.

While under normal working conditions the pressure of the steam generated will be governed by the pressure at which water is fed to the generator pipe or coil $b$, I prefer to arrange in the length of the pipe $b'$, a valve $b^3$ which has the two-fold function of preventing delivery of water to said generator tube until the tube has been sufficiently heated to convert it into steam, and to permit the reduction of the volume of water flowing through said generator under normal working conditions to increase the pressure at which the steam generated therein is delivered to the steam jet nozzle $c$, or accommodate the volume of water being delivered to the generator to its heating surface to ensure the desired temperature of the steam delivered through the outlet $b^2$.

Figure 3:
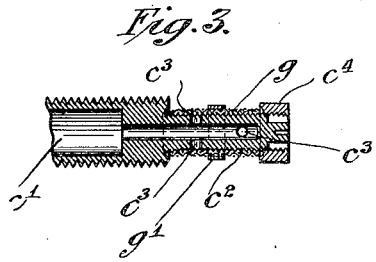
Fig. 3 is a detail sectional view of the filter at the inlet of the steam injector nozzle.

To prevent impurities being introduced to the inflammable mixture with the steam, I provide in the conduit $c$, a wire gauze filter $g$, the detailed construction of which is shown in Fig. 3 of the drawings, this construction being employed not only to facilitate the assembling of the burner, but to permit the removal of the filter for the purpose of cleaning same.

The end of the conduit $c$ into which the outlet pipe $b^2$ discharges, has relatively greater capacity than the jet nozzle $c'$. The rear end of this nozzle terminates in an exteriorly screw-threaded nipple $c^2$ about which is coiled in the desired number of laps, a length of the wire gauze forming the filter $g$. Said nipple $c^2$ has a plurality of openings $c^3$ therethrough, the end thereof being closed. Mounted upon the end of the nipple $c^2$ is a nut $c^4$ having an interior bevel adapted to engage and compact the edge of the coil of wire gauze $g$ adjacent thereto. Encircling said coil of gauze is a small band $g'$, the function of which is to prevent the buckling of said gauze, and to give it form so that it may be readily slipped upon, and from, the nipple $c^2$.

Communicating with the conduit $c$ is a pet cock $h$ by means of which condensate in said conduit may be drained therefrom when necessity demands, or steam may be permitted to escape to atmosphere when first starting the burner, to prevent the delivery of a mixture of steam and water to the jet nozzle $c'$.

The capacity of the jet nozzle $d^2$ is relatively greater than that of the nozzle $c'$ so as to prevent the development of back pressure in the tube $d$ to an extent which will interfere with the desired injector action of the nozzle $c'$ in drawing gas from the pipe $d'$ communicating with the source of gas supply.

The operation of the herein described burner is substantially as follows:—

In starting the burner, gas is admitted to the tube $d$ by opening the valve in the pipe $d'$, and flows under the pressure in the gas main, through the nozzle $d^2$ and mixing tube $e$ to the burner $a$. The gas is ignited as it leaves the torch burners $a'$. Before opening the valve in the pipe $d'$, the valve $b^3$ should be closed and the pet cock $h$ opened to drain water from the generator $b$ and the tube $c$ so as to be sure of not flooding the tube $d$ with water.

In a minute or two the pipe of the generator $b$ will be sufficiently heated by the flame which impinges directly thereupon, to ensure the generation of steam therein when water is admitted thereto through the pipe $b'$. When this condition exists, the valve $b^3$ is opened, the water flowing into the generator $b$ being instantly converted into steam, this generator being in the nature of a flash boiler so far as the rapid production of steam is concerned.

The steam thus generated will flow through the outlet pipe $b^2$ to the conduit $c$, it being permissible to allow the valve $h$ to remain open until all water contained in said conduit $c$ is blown therefrom with the steam.

The said pet cock $h$ is then closed and a jet of steam is delivered by the nozzle $c'$ into the steam and gas mixing tube $d$ through which it will pass, acting as an injector jet to draw a sufficient volume of gas with it into the tube $d$ to ensure the desired mixture of gas and steam, irrespective of the pressure at which the gas is flowing through the pipe $d'$.

As the mixture of gas and steam emerges from the jet nozzle $d^2$, it will inject air through the inlet $e'$ and so associate it with the flowing mixture of gas and steam as to ensure a highly inflammable mixture.

Ordinarily the steam developed in the generator $b$ will be at a pressure not exceeding fifty pounds, or at a pressure determined by that of the water in the mains from which the pipe $b'$ leads.

Before the steam is generated, it will be observed that the flame of the burners $a'$ will be a blue and yellow flame which burns with more or less imperfect combustion. The flame, as in all torch burners, will be rather long, according to the size of the burner opening.

When steam is admitted and before it has attained the desired temperature, the flame will be a blue and orange flame, starting very close to the burner opening, but with the attainment of the desired pressure and temperature of the steam, the length of the flame will be increased, and the rate of the flow of the gases will be sufficiently rapid to exceed the rate of propagation of the flame, so that no flame will be visible for from an inch to an inch and one-half from the burner opening. Under this condition, the flame will be blue and violet, and will emit intense heat. If it be found that the pressure is too great, the valve $b^3$ may be used to increase the flow of water to the generator, which will result in a less rapid development of steam and a lower temperature and lower pressure. If to the contrary, it be found that the pressure and temperature are not high enough, the valve $b^3$ may be used to reduce the supply of water.

It will be found, however, that the volume of gas entering into the mixture will vary in proportion to the steam generated, so that when the burner is once set, it will continue to operate under substantially uniform conditions and with a substantially uniform mixture. The same conditions which will thus automatically adjust the proportion of steam entering into the mixture, will modify the volume of air combined with the steam and gas mixture, so as to preserve the desired proportion of air entering into the mixture.

I have found in actual use that irrespective of the pressure at which the gas is delivered to the pipe $d'$, a substantially uniform volume of gas enters the mixture, since the arrangement of the jet nozzle $c'$ will accelerate the flow of gas through the pipe $d'$ with any lowering of the pressure of gas within said pipe.

The detailed construction shown in the accompanying drawings is immaterial to the invention, such being formed largely of standard parts adapted to the particular type of burner structure shown. These parts may be specially designed if desired, without departing from the spirit and scope of the invention.

It is not my intention to limit myself to the form of burner shown in the drawings, nor to the particular construction of the generator tube or coil, it being apparent that they are capable of wide variation.

Having described the invention, what I claim as new and desire to have protected by Letters Patent, is:—

1. A gaseous fuel burner embodying therein a burner having openings therein, a steam generator adjacent said burner openings, an injector nozzle, means connecting said generator with a source of water supply, an outlet pipe leading from said generator to said nozzle, a tube having an injector nozzle surrounding said first named nozzle and communicating with a source of gas supply, and a mixing tube surrounding said tube and having an air inlet opening, said mixing tube delivering the mixture to said burner.

2. A gaseous fuel burner embodying therein a burner having openings therein, a steam generator adjacent said burner openings, an injector nozzle, means connecting said generator with a source of water supply, means whereby the rate of the flow of water therethrough may be regulated, an outlet pipe leading from said generator to said nozzle, a tube having an injector nozzle surrounding said first named nozzle and communicating with a source of gas supply, and a mixing tube surrounding said tube and having an air inlet opening, said mixing tube delivering the mixture to said burner.

3. A gaseous fuel burner embodying therein a burner having openings therein, a steam generator adjacent said burner openings, an injector nozzle, a pipe connection between said nozzle and said generator, a steam and gas mixing tube surrounding said nozzle, said tube adjacent said nozzle communicating with a source of gas supply, whereby steam and gas will be mixed in said tube and delivered therefrom as a mixture, a second mixing tube surrounding said steam and gas mixing tube, one end of said tube communicating with atmosphere and the other end thereof delivering the mixture of gas, steam and air to said burner openings, and means whereby water under pressure is constantly delivered to said generator.

4. A gaseous fuel burner embodying therein a burner having openings therein, a steam generator adjacent said burner openings, an injector nozzle, a pipe connection between said nozzle and said generator, a steam and gas mixing tube surrounding said nozzle, said tube adjacent said nozzle communicating with a source of gas supply, whereby steam and gas will be mixed in said tube and delivered therefrom as a mixture, a second mixing tube surrounding said steam and gas mixing tube, one end of said tube communicating with atmosphere and the other end thereof delivering the mixture of gas, steam and air to said burner openings, means whereby water under pressure is constantly delivered to said generator, and means whereby the volume of water delivered to said generator may be regulated.

5. A gaseous fuel burner embodying therein a burner having openings therein, an injector nozzle, means whereby steam under pressure is supplied to said nozzle, a filter carried by the inlet of said nozzle, a tube having an injector nozzle surrounding said first named nozzle and communicating with a source of gas supply, and a mixing tube surrounding said tube and having an air inlet opening, said mixing tube delivering the mixture to said burner.

6. A gaseous fuel burner embodying therein a burner having openings therein, an injector nozzle, means whereby steam under pressure is supplied to said nozzle, a tube having an injector nozzle surrounding said first named nozzle and communicating with a source of gas supply, a pet cock arranged in said means, whereby condensate and water may be drained therefrom to prevent the flooding of said tube, and a mixing tube surrounding said tube and having an air inlet opening, said mixing tube delivering the mixture to said burner.

In witness whereof I have hereunto affixed my signature, in the presence of two subscribing witnesses, this 13th day of May, 1920.

WILLIAM RUFF.

Witnesses:
 FRIEDA KOEHLER,
 SOPHIE M. BAEDER.